United States Patent [19]

Nakamura et al.

[11] Patent Number: 4,752,599

[45] Date of Patent: Jun. 21, 1988

[54] METHOD FOR PRODUCING A BASE OF A CATALYST CARRIER FOR AUTOMOBILE EXHAUST GAS-PURIFICATION

[75] Inventors: Yasushi Nakamura; Mikio Yamanaka; Keiichi Ohmura, all of Kanagawa; Motohiko Arakawa, Tokyo; Toshiyuki Yashiro, Tokyo; Masaki Izumi, Tokyo, all of Japan

[73] Assignees: Nippon Steel Corporation; Nippon Kinzoku Co., Ltd., both of Tokyo, Japan

[21] Appl. No.: 30,609

[22] Filed: Mar. 27, 1987

[30] Foreign Application Priority Data

Mar. 31, 1986 [JP] Japan .................................. 61-71273

[51] Int. Cl.$^4$ .......................... B01J 32/00; B01J 35/04
[52] U.S. Cl. .................................. 502/257; 502/306; 502/316; 502/439; 502/527
[58] Field of Search ............... 502/439, 527, 257, 306, 502/316; 423/213.5; 422/177, 180

[56] References Cited

U.S. PATENT DOCUMENTS 4,188,309 2/1980 Völker et al. ................... 502/527 X
4,587,231 5/1986 Sawamura et al. .................. 502/304
4,601,999 7/1986 Retallick et al. ............... 502/439 X

*Primary Examiner*—W. J. Shine
*Attorney, Agent, or Firm*—Wenderoth, Lind & Ponack

[57] ABSTRACT

In a carrier for a catalyst for purifying exhaust gas, a honeycomb is formed by coiling a corrugated sheet and a flat sheet together, and is mounted in an outer cylinder. An Al (alloy)-clad foil or hot-dip Al (alloy) galvanized foil is used to form the honeycomb, which is heat treated in a vacuum or a reducing atmosphere to simultaneously bond the corrugated sheet and flat sheet together and also bond the honeycomb to the outer cylinder, and to diffuse Al into the foil.

7 Claims, No Drawings

METHOD FOR PRODUCING A BASE OF A CATALYST CARRIER FOR AUTOMOBILE EXHAUST GAS-PURIFICATION

BACKGROUND OF THE INVENTION

1. Field of the Invention

The present invention relates to a method for producing a base of a catalyst carrier used for an exhaust gas purification device in an automobile.

2. Description of the Prior Art

Since the nineteen-seventies, air pollution by automobile emission control has become a social problem, and regulations for the automobile exhaust emissions have been promulgated to the effect that passenger automobiles must be equipped with a device for purifying the exhaust gas. Several systems have been proposed for devices for purifying the exhaust gas, but the most widely used at present is a catalyst converter system whereby HC and CO are oxidized and, simultaneously, NOx is reduced. These catalyst converters are made up of a ceramic honeycomb of corderite, mounted in a metallic cylinder, as a fundamental body, on which porous $\gamma$-$Al_2O_3$ powder, impregnated with a noble metal (Pt~Pd) catalyst, is deposited. The ceramic honeycomb, however, has disadvantages in that it is not highly resistant to mechanical impact, and in addition, the exhaust resistance is undesirably high. The techniques disclosed to cope with these drawbacks include a known metal honeycomb in which metal foils of several tens in the form of a flat sheet and corrugated one are coiled into a roll insert mounted in an outer case of stainless steel.

Japanese Examined Patent Publication No. 57-55,886, discloses an improvement of the above method by a technique in which the metal honeycomb is fixed to the outer case at the ends of the body by electron beam welding or by brazing, or improved by the technique disclosed in Japanese Examined Patent Publication No. 58-23,138. These techniques, however, have various drawbacks. For example, a high Al-containing stainless steel used for the foil because of its excellent oxidation resistance has a poor rollability and is expensive. Also, from the viewpoint of the rollability, limitations should be imposed on the amount of alloying elements, which makes it difficult to attain a stable formation of an $Al_2O_3$ film necessary for maintaining a sufficient oxidation resistance for a long time. In attempts to eliminate these drawbacks, Japanese Unexamined Patent Publication No. 54-97,593, Japanese Examined Patent Publication No. 57-3,418, Japanese Unexamined Patent Publication No. 54-33,888, and German Patent No. 2,745,188 disclose giving iron, stainless steel, heat-resistant alloy or the like, an Al coating, and then carrying out a chemical treatment or heat treatment in an oxidizing atmosphere, thereby forming an $Al_2O_3$ film or alloy.

In the manufacture of a metal substrate, the metal foils are formed into a honeycomb, followed by a bonding process between corrugated sheets and flat sheets as well as bonding between the outer cylinder and honeycomb. Generally, this bonding is carried out by brazing. The brazing material used for this bonding must be a high Ni-brazing material with a high melting point and a high heat resistance, considering the severe condition under which the brazed assembly is used. Thus, Ni is oxidized at the surface of brazed parts by the exhaust gas. Since the Ni oxide has an effect of catalysis on unburnt components in the exhaust gas, a reaction takes place at the brazed parts, causing a partial rise in temperature at these parts. Accordingly, the brazed parts may melt down, if the Ni-brazing material has a melting point of less than 1100° C. Accordingly, it is necessary to use a brazing material having a melting point of 1100° C or more. Therefore, the heat treatment must be carried out at a temperature of 1100° C or more, in vacuum, for a perfect brazing.

In addition, because of a high Al content of the substrate, the wettability and the flowability of the brazing material are greatly reduced on the substrate surface. Accordingly, the high temperature necessary for the heat treatment lowers the production efficiency and increases costs. Furthermore, the brazed parts of a honeycomb manufactured as described above contain only a small amount of Al diffused from the substrate material, with the result that an $Al_2O_3$ film having an excellent heat-resistance cannot be formed. Thus, the heatresistance of the brazed parts is lower than that of the substrate material, and the adhesion of $\gamma$-$Al_2O_3$ powder is poor.

The catalyst carrier is exposed to severe operating conditions, for example, a high speed exhaust gas flow and extreme mechanical vibration upon acceleration. Therefore, the bonding strength of a carrier is another important factor in the durability of the device. As is clear from the above explanation, to enable the use of Al-coated material for the substrate of a catalyst carrier, a novel bonding technique must be developed.

SUMMARY OF THE INVENTION

The present invention is intended to eliminate the above disadvantages.

Therefore, the present invention enables the mutual bonding of parts of a honeycomb and the bonding between the honeycomb and the outer cylinder by using an Al or Al-alloy coating as the brazing material, thus eliminating the need for an additional brazing material, while imparting a very high Al content to the substrate required for the formation of a protective $Al_2O_3$ film and a high heat resistance without trouble in cold rolling of the substrate foil.

Namely, the present invention provides a method for producing a base of a catalyst carrier for a device for the purification of the exhaust gas of an automobile, and is characterized by rolling a stainless-steel sheet having a layer consisting of Al or Al-alloy clad on one or both surfaces of the stainless-steel sheet to form a composite (clad) foil, producing a honeycomb structure by using the composite foil, mounting the honeycomb structure in an outer cylinder of heat-resistant steel, to form a carrier base, and heat-treating the carrier base in vacuum or a reducing atmosphere at a temperature of 600° to 1300° C. In the present invention, the stainless steel strip is the core material of the composite foil, and the heat-resistance can be further enhanced when this core material is an Al-containing stainless steel. The stainless steel strip having a foil layer clad on one or both surfaces thereof may be a so-called "clad foil" which is obtained by rolling an Al (alloy)—stainless steel—Al (alloy) composite sheet, or may be an Al plated stainless-steel sheet formed by hot-dipping to a predetermined thickness. The reducing atmosphere mentioned above may conventionally contain hydrogen gas or the like, and in addition, may be produced by a reducing agent dispersed on the honeycomb. The base formed by the method according to the present invention is subsequently heated, if necessary, at a temperature of from 850° to 1200° C. in air atmosphere, to form an $Al_2O_3$ film on which $\gamma$-$Al_2O_3$ as the direct carrier of the catalyst is then deposited.

DESCRIPTION OF THE PREFERRED EMBODIMENTS

The present invention is now explained in detail.

The Al layer used in the present invention may be a layer of pure Al, and in addition, may consist of corrosion-resistant Al alloys or high-strength Al alloys containing one or more of Mn, Mg, Si, Cu, and the like.

The surface of the stainless steel strip used in the present invention is alloyed with the Al layer by the subsequent heat treatment, so that an improved heat-resistance is exhibited. Accordingly, any of the martensitic, austenitic, and dual-phase stainless steels can be used, provided that these steels contain 9% or more of Cr and are rollable. The desirable compositionseries according to the present invention are 0.5% or less of C, 0~60% of Ni, 9~30% of Cr, 0~10% of one or more of Mo, W, and Co, 0~3% of one or more of Ti, Nb, Zr, and Hf, 0~0.2% of rare earth metal (REM) and Y, 0~0.01% of one or more of Mg and Ca, and, if necessary, a small amount of Cu and B; the balance being Fe and unavoidable impurities. Even if Al is not added to the stainless steel strip, the strip is enriched with Al by the subsequent heat treatment from the surface Al or Al alloy layer. Nevertheless, the heat-resistance of the honeycomb is further enhanced if 6% or less of Al is preliminarily added to the stainless steel strip.

The stainless steel foil having foil layers of Al or Al-alloy clad on both surfaces thereof is then produced according to the following procedures. A material clad with Al or an Al-alloy is produced, or a hot-dip Al plating is carried out, in a process wherein the stainless steel strip has a thickness of from approximately 0.1 to 1.0 mm. The Al or Al-alloy coated or clad strip is further rolled until a foil thickness, e.g., from 30 to 70 μm, appropriate for the metal honeycomb is obtained. The clad material may be produced by any appropriate known method, e.g., a rolling method. In the hot-dip Al-plating, the formation of a Fe-Al alloy layer between Al and the substrate should be suppressed as thin as possible, to ensure an excellent rollability thereof after the plating. To this end, a small amount of Si should be added to the molten Al bath or a small amount of N preliminarily should be added to the stainless steel. The thickness ratio of the stainless-steel sheet to the Al or Al alloy layer is desirably from approximately 15:1 to approximately 3:1, at the time of forming the honeycomb. This thickness ratio determines the Al content, i.e., the heat-resistance of a honeycomb after being subjected to a subsequent heat treatment. Generally, the heat-resistance is enhanced with an increase in the Al content, but an excessive Al content leads not only to an embrittlement of material but also to a lowering of the melting point, with the result that the catalyst carrier is not durable at a high temperature. The Al content is, therefore, preferably 30% by weight or less after the alloy is formed by cladding followed by heat treatment.

A composite foil produced as described above is subjected to corrugation shaping and is then overlapped with a composite foil in the form of a flat sheet. Both foils are then coiled in the form of a roll or are laminated to provide a honeycomb body, which is then press-mounted in an outer cylinder made of heat-resistant steel. The heat-resistant steel herein may be a heat-resistant casting, low-alloy steel, or stainless steel, provided that a satisfactory heat resistance of the container of the catalyst for the exhaust gas purification device is provided.

The honeycomb or the outer cylinder having the honeycomb mounted therein is heat-treated at a temperature of from 600° to 1300° C. in vacuum or a reducing atmosphere. The Al or Al-alloy present on the surface(s) of the honeycomb is then alloyed with the inner stainless steel by a mutual diffusion, and as a result, an excellent heat-resistance is given, while the contacting parts between the corrugated sheet and the flat sheet, as well as the contacting parts between the outermost peripheral surface of the honeycomb and the inner surface of the outer cylinder are fusion-adhered together by the high Al layer on the surface with a relatively low melting temperature, thereby providing a strong fixing therebetween. It is possible to enlarge the bonding area and smooth the bonding by inserting an Al foil or an Al-alloy foil between the outermost peripheral surface of the honeycomb and the inner surface of the outer cylinder. The vacuum and reducing atmosphere referred to herein, which is indispensable for the bonding of a honeycomb, is generally such that an oxide film having a thickness detrimental to the bonding is not formed on the surfaces of the high Al layer during the heat treatment for bonding. Specifically, the vacuum must have a pressure of $10^{-4}$ Torr or less, and the reducing atmosphere must be non-oxidizing gas, e.g., dry hydrogen, or dry nitrogen, argon, helium or the like, with a hydrogen content of 5% or more. To create the reducing atmosphere necessary for the above bonding, Al, Ti, Zn, or polyethyleneimine in powder or liquid form, which are active elements or compounds, is coated on the surfaces of honeycomb, and the heat treatment is then carried out in an inert atmosphere of argon gas or the like, or in an air atmosphere while sealing the honeycomb with another foil of stainless steel. An excellent bonding is also obtained in this case.

The temperature of the heat-treatment for bonding is such that the fusion-adhesion due to the high Al layer with relatively low melting temperature or Al-alloy occurs, specifically, a temperature of 600° C. or more. Since Fe diffuses from the core material into the coating layer simultaneously with the melting thereof, the coating layer instantaneously becomes an Fe-Al alloy, causing the melting point to rise and the layer to once solidify and to melt or nearly melt again at higher temperature, because the Al content is very high in the Fe-Al alloy layer at an early stage of diffusion and the melting temperature is not so high. The possible Al content of the Fe-Al alloy is 30 wt % at the highest after heat treatment, and the solidus of this alloy is 1300° C. The highest temperature for bonding treatment is, therefore, set at 1300° C.

Since the oxygen potential of the vacuum or inert gas-atmosphere becomes higher as the temperature becomes higher, slight oxidation takes place even in the vacuum or inert gas atmosphere. Therefore, when the heat treatment for bonding is carried out at a high temperature, the formation of a thin $Al_2O_3$ film occurs simultaneously with the fusion bonding, and the $Al_2O_3$ film remains on the fusion-bonded honeycomb, and the like. The formation of an $Al_2O_3$ film is, however, weak and the carrier blackens at around 700° C. during the bonding treatment. In this case, the oxidizing treatment is carried out later at a temperature of from 850° to 1200° C.

Also, after brazing, it is evidently desirable to additionally form the Al₂O₃ film by heating the brazed assembly in air. As described above, an outstanding feature of the present invention is that a stainless steel-foil having an Al- or Al-alloy-coating on the surface(s) is heat treated in vacuum or a reducing atmosphere, thereby simultaneously realizing a fusion-bonding between the contact parts, an improvement in the heat-resistance due to Al-diffusion from the coating layer to the core material, and the formation of the Al₂O₃ film. If the bonding between the contacting parts of a honeycomb is unsatisfactory, a small amount of brazing material is supplementarily used to ensure the reliability of the bonding.

The present invention is further explained by way of examples.

EXAMPLE 1

TABLE 1

| | Substrate Material | Honeycomb Manufacturing Method | Conditions for Bonding Treatment | Result of Durability Bench Test |
|---|---|---|---|---|
| Comparative Example | 15Cr—4Al | Rolling to 50 μm. Corrugation forming. Corrugated sheet and flat sheet assembled, and coiled to form honeycomb 70φ × 90 (mm) 1 | Corrugated and flat sheets bonded with brazing material (BNi5-grade). Treated at 1140° C. in vaccumm. | Abnormal oxidation occurs at brazed parts. |
| Inventive Examples | 17Cr—0.3Ti—0.01C (XM) | Al foil is clad with 0.3 mm thick stainless and composite foil then rolled to 50 μm. Stainless/Al = 10/1 (thickness ratio) | Heat treatment at 900° C. in vacuum | Normal |
| | | Al foil is hot-dip galvanized with 0.8 mm thick stainless and composite foil then rolled to 70 μm. Stainless/Al = 6/1 (thickness ratio) | Heat treatment at 600° C. in vaccuum | Normal |
| | 25Cr—20Ni (SUS 310S) | Rolling to 50 μm. 5 μm thick Al foils bonded to both surfaces of SUS by warm rolling. Stainless steel/Al = 6/1 (thickness ratio) | Heat treatment at 1000° C. in hydrogen | Normal |
| Comparative Example | 25Cr—20Ni (SUS 310S) | Rolling to 50 μm. 5 μm thick Al foils bonded to both surfaces of SUS by warm rolling. Stainless steel/Al = 6/1 (thickness ratio) | Heat treatment at 1000° C. in air. No bonding. | — |

As shown in Table 1, in one of the comparative examples, a rolled foil of 15Cr-4Al-steel was produced and shaped into a honeycomb, and the honeycomb was mounted in an outer cylinder made of AISI 304. Partial brazing was done for the flat and corrugated foils of the honeycomb, while brazing of the outer cylinder to the entire surface of the honeycomb periphery was carried out by using a BNi-5 grade brazing material, in vacuum at 1140° C.

In one of the examples according to the present invention, Al foils (20 μm thick) were bonded to both surfaces of a ferritic stainless-steel sheet (0.3 mm thick) containing 17Cr-0.3Ti-0.01 C, by warm rolling. Rolling was then carried out to obtain a composite foil of 50 μm thickness. Subsequently, a honeycomb was manufactured and mounted in an outer cylinder made of AISI 304. The brazing together of parts of the honeycomb components and of the outer cylinder and the honeycomb was carried out by a heat treatment at 900° C. in vacuum.

In another example according to the present invention, a 0.8 mm thick stainless-steel sheet having the same composition as that of the above example was subjected to hot-dip Al plating and then rolled to a thickness of 70 μm. The honeycomb was shaped by the same method and then mounted in the outer cylinder. The heat treatment was carried out at 600° C. in vacuum.

After the heat treatment, the above three honeycombs were subjected to a further treatment at 900° C. for 7 hours in air to form the Al₂O₃ film.

In the other example according to the present invention, 5 um thick Al foils were pressure-bonded on both surfaces of a 50 m thick foil of 25Cr-20Ni (AISI 310) by warm rolling, to obtain a clad material. The honeycomb was shaped by the same method and was mounted in the outer cylinder made of AISI 310. The heat treatment was carried out at 1000° C. in vacuum. The same process was repeated except for a heat treatment at 1000° C. in air, with regard to the other comparative example.

As a result, the bonding of honeycombs was attained by the heat treatment at a relatively low temperature, without the use of a brazing material, in the examples according to the present invention. The heat treatment in air did not result in a satisfactory bonding.

The brazed assemblies, including those of the comparative examples, were connected to and directly behind the exhaust manifold of an engine having a displacement of 1600 cc. A durability test was carried out over 30 hours at an output of 40 horsepower and an engine rotation speed of 5000 rpm. The temperature of the exhaust gas was set in the range of from 940 to 1000° C. by delaying the ignition angle. Note, γ-Al₂O₃ powder was not coated on the Al₂O₃ film. As a result, abnormal oxidation occurred on portions of the brazed parts in the brazed assembly of the comparative example, but the brazed assemblies of the present invention remained totally normal and exhibited neither a peeling of the bonded parts nor deformation of the honeycombs.

EXAMPLE 2

Three cold-rolled strips of 15Cr-4.5Al steel, having a thickness of 0.4 mm were prepared. Al foils (40 m thick) were superimposed on both surfaces of one of the strips.

The resultant three layers were bonded by cold rolling with a large reduction of 67% for one pass, and then rolled in the subsequent passes to a thickness of 50 μm.

Al-alloy foils (Al-10% Si-1% Mg) (40 μm thick) were clad on both surfaces of another strip, and the resultant three layers were also rolled to obtain a composite foil of 50 μm thickness.

The remaining steel strip was subjected to Al-alloy (Al-10% Si) hot-dip plating. The amount of Al-alloy deposited per side was from 27 to 36 μm. The thus-treated steel strip was then rolled to a thickness of 50 μm.

As a result, three kinds of clad foils in total were obtained. These clad foils were used to form 5 honeycombs from each foil. Each honeycomb was pressed into an outer cylinder made of SUS 310S and heat-treated under the conditions shown in Table 2.

exhaust gas purification device of an automobile, by an extremely simple method, in place of the conventional brazing method. Further, in this method, the honeycomb is given a very high heat resistance. Accordingly, it further contributes to a cost reduction and an enhancement of the characteristics of such a catalyst converter.

We claim:

1. A method for producing a base, on which a catalyst carrier for purifying exhaust gas is deposited, comprising the steps of:

preparing a stainless-steel sheet;

forming a layer of Al or Al-alloy on one or both surfaces of the stainless-steel sheet;

rolling the stainless-steel sheet having the layer of Al or Al-alloy thereon to thereby form a composite foil;

TABLE 2

| | Foil Structure | Conditions for Heat Treatment | Bonding Condition | Result of Bench Test |
|---|---|---|---|---|
| Comparative | Rolling clad of | 1000° C. × 1 hr in air | No Bonding | Protrusion at central part |
| Invention | Pure Al— SUS— Pure Al | 900° C. × 1 hr in dry $H_2$ | Bonded | No Abnormality |
| | | 1000° C. × 1 hr in 5% $H_2$—Ar | Bonded | No Abnormality |
| | | Application of Al powder. 1250° C. × 1 hr in Ar | Bonded | No Abnormality |
| | | Application of Ti powder Sealed in stainless foil at both ends of honeycomb 1200° C. × 1 hr in air | Bonded | No Abnormality |
| | | 1000° C. × 1 hr in vacuum ($10^{-4}$ Torr) | Bonded | No Abnormality |
| Comparative | Rolling clad of | 1000° C. × 1 hr in air | No Bonding | Protrusion at central part |
| Invention | Al alloy- SUS- Al alloy | 900° C. × 1 hr in dry $H_2$ | Bonded | No Abnormality |
| | | 1000° C. × 1 hr in 5% $H_2$—Ar | Bonded | No Abnormality |
| | | Application of Al powder. 1250° C. × 1 hr in Ar | Bonded | No Abnormality |
| | | Application of Ti powder Sealed in stainless foil at both ends of honeycomb 1200° C. × 1 hr in air | Bonded | No Abnormality |
| | | 1000° C. × 1 hr in vacuum ($10^{-4}$ Torr) | Bonded | No Abnormality |
| Comparative | Rolling cladding, | 650° C. × 1 hr in air | No Bonding | Protrusion at central part |
| Invention | after Hot dip plating of Al alloy | 650° C. × 1 hr in dry $H_2$ | Bonded | No Abnormality |
| | | 800° C. × 1 hr in 5% $H_2$—Ar | Bonded | No Abnormality |
| | | Application of Al powder. 1000° C. × 1 hr in Ar | Bonded | No Abnormality |
| | | Application of Ti powder Sealed in stainless foil at both ends of honeycomb 1000° C. × 1 hr in air | Bonded | No Abnormality |
| | | 650° C. × 1 hr in vacuum ($10^{-4}$ Torr) | Bonded | No Abnormality |

After the heat treatment, the bonding conditions of the brazed assemblies were confirmed by the same bench test by an engine as in Example 1.

As a result it was recognized that, in the direct heat treatment in air (Comparative Examples) bonding of the honeycombs was not realized, and that an abnormality occurred, i.e., the central part of the honeycombs protruded in the direction of flow of the exhaust gas, as a result of the bench test. Contrary to this, in the heat treatments in dry $H_2$, 5% $H_2$-Ar, vacuum, Ar gas (after application of Al powder), and in air (after application of Ti powder and sealing by stainless steel foils at both ends of the honeycomb), the bonding of honeycombs was realized and the abnormality appearing in the Comparative Examples did not occur.

As described hereinafter, the present invention makes it possible to carry out bonding a honeycomb for the shaping one part of said composite foil into a corrugated sheet, while leaving the other part thereof in a form of a flat sheet;

producing a honeycomb structure by assembling the corrugated sheet and the flat sheet;

mounting the honeycomb in an outer cylinder made of heat-resistant steel and;

heat treating said mounted honeycomb and outer cylinder in vacuum or a reducing atmosphere at a temperature of from 600° to 1300° C.

2. A method according to claim 1, wherein the stainless-steel sheet to be provided with the Al or Al-alloy layer thereon, is an Al-containing stainless steel strip.

3. A method according to claim 1, wherein the layer of Al or Al-alloy is a foil layer.

4. A method according to claim 1, wherein the layer of Al or Al-alloy is a hot-dip plating layer of Al or Al-alloy.

5. A method according to claim 1, wherein the Al-alloy contains one or more of Mn, Mg, Si, and Cu.

6. A method according to claim 2, wherein the layer of Al or Al-alloy is a foil layer.

7. A method according to claim 2, wherein the layer of Al or Al-alloy is a hit-dip plating layer of Al or Al-alloy.

* * * * *